United States Patent
Chong et al.

(10) Patent No.: US 10,382,755 B2
(45) Date of Patent: Aug. 13, 2019

(54) LOW COMPLEXITY SAMPLE ADAPTIVE OFFSET (SAO) CODING

(71) Applicant: QUALCOMM Incorporated, San Diego, CA (US)

(72) Inventors: In Suk Chong, San Diego, CA (US); Geert Van der Auwera, Del Mar, CA (US); Chengjie Tu, San Diego, CA (US); Xianglin Wang, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/876,897

(22) Filed: Jan. 22, 2018

(65) Prior Publication Data

US 2018/0146194 A1 May 24, 2018

Related U.S. Application Data

(63) Continuation of application No. 14/856,192, filed on Sep. 16, 2015, now Pat. No. 9,877,024.

(Continued)

(51) Int. Cl.
*H04N 11/02* (2006.01)
*H04N 19/117* (2014.01)
(Continued)

(52) U.S. Cl.
CPC ......... *H04N 19/117* (2014.11); *H04N 19/176* (2014.11); *H04N 19/61* (2014.11); *H04N 19/82* (2014.11)

(58) Field of Classification Search
CPC .................................................. H04N 19/117
(Continued)

(56) References Cited

U.S. PATENT DOCUMENTS 9,877,024 B2    1/2018   Chong et al.
2012/0177103 A1*  7/2012  Fu ........................ H04N 19/82
                                                     375/240.02
(Continued)

FOREIGN PATENT DOCUMENTS

WO    2013070147 A1    5/2013
WO    2013109419 A1    7/2013

OTHER PUBLICATIONS

Andersson K., et al., "Modified SAO edge offsets," 7. JCT-VC meeting, 98. MPEG meeting, Nov. 21, 2011-Nov. 30, 2011, Geneva, (Joint Collaborative Team on Video Coding of ISO/IEC JTC1/SC29/WG11 and ITU-T SG.16), URL: http://wftp3.itu.int/AV-ARCH/JCTVC-SITE/, No. JCTVC-G490, Nov. 2011 (Nov. 8, 2011), pp. 6, XP030110474, the whole document.

(Continued)

*Primary Examiner* — Leron Beck
(74) *Attorney, Agent, or Firm* — Shumaker & Sieffert, P.A.

(57) ABSTRACT

A device for encoding video data may be configured to encode video data according to a set of sample adaptive offset (SAO) types; perform a plurality of coding passes to test a subset of the SAO types for a first block of video data, wherein the subset is smaller than the set; select from the subset of SAO types an SAO type for the first block of video data; and generate for inclusion in an encoded bitstream, information for identifying the selected SAO type for the first block.

18 Claims, 13 Drawing Sheets

Related U.S. Application Data

(60) Provisional application No. 62/129,628, filed on Mar. 6, 2015.

(51) Int. Cl.
*H04N 19/176* (2014.01)
*H04N 19/61* (2014.01)
*H04N 19/82* (2014.01)

(58) Field of Classification Search
USPC .................................... 375/240.01–240.29
See application file for complete search history.

(56) References Cited

U.S. PATENT DOCUMENTS

| | | | |
|---|---|---|---|
| 2012/0294353 | A1 | 11/2012 | Fu et al. |
| 2013/0022103 | A1 | 1/2013 | Budagavi |
| 2013/0114683 | A1 | 5/2013 | Zhao et al. |
| 2013/0177068 | A1* | 7/2013 | Minoo ............... H04N 19/117 375/240.02 |
| 2013/0272376 | A1* | 10/2013 | Maani ................. H04N 19/82 375/240.02 |
| 2013/0336383 | A1* | 12/2013 | Xu ..................... H04N 19/46 375/240.02 |
| 2013/0336386 | A1 | 12/2013 | Chong et al. |
| 2014/0328389 | A1 | 11/2014 | Fu et al. |
| 2015/0010052 | A1* | 1/2015 | Mody ................ H04N 19/176 375/240.02 |
| 2015/0172678 | A1 | 6/2015 | Alshina et al. |
| 2016/0261874 | A1 | 9/2016 | Chong et al. |

OTHER PUBLICATIONS

Bross B., et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v13, 12th Meeting: Geneva, CH, Jan. 14-23, 2013, 310 pages.
Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.
Bross B., et al., "High Efficiency Video Coding (HEVC) text specification draft 8," 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/, No. JCTVC-J1003_d7, Jul. 23, 2012 (Jul. 23, 2012), XP030112947, 260 Pages.
Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Bross, et al., "High Efficiency Video Coding (HEVC) Text Specification Draft 9," Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012 , 290 pp.
Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Fu C-M., et al., "Sample Adaptive Offset in the HEVC Standard," IEEE Transactions on Circuits and Systems for Video Technology, Institute of Electrical and Electronics Engineers, USA, Dec. 1, 2012, vol. 22, No. 12, pp. 1755-1764, XP011487153, ISSN: 1051-8215, DOI:10.1109/TCSVT.2012.2221529.
International Preliminary Report on Patentability from International Application No. PCT/US2016/018905, dated May 19, 2017, 22 pp.
International Search Report and Written Opinion—PCT/US2016/018905—ISA/EPO—dated Apr. 28, 2016.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, High efficiency video coding, The International Telecommunication Union, Apr. 2013, 317 pages.
ITU-T H.265, Series H: Audiovisual and Multimedia Systems, Infrastructure of audiovisual services—Coding of moving video, High efficiency video coding, The International Telecommunication Union, Apr. 2015, 634 pp.
ITU-T H.265, Series H: Audiovisual and Multimedia Systems, Infrastructure of audiovisual services—Coding of moving video, High efficiency video coding, The International Telecommunication Union, Oct. 2014, 540 pp.
McCann K., et al., "HM4: HEVC Test Model 4 Encoder Description" , 6. JCT-VC meeting, 97. MPEG meeting, Jul. 14, 2011-Jul. 22, 2011, Torino, (Joint Collaborative Team on Video Coding of ISO/IEC JTC1/SC29/WG11 and ITU-T SG.16 ); URL: http://wftp3.itu.int/AV-ARCH/JCTVC-SITE/, No. JCTVC-F802, Oct. 4, 2011 (Oct. 4, 2011), XP030009799, sections 5.4.1, 5.4.2.
Response to the Written Opinion dated Apr. 28, 2016 in International Application No. PCT/US2016/018905, filed Apr. 28, 2016, 4 pp.
Second Written Opinion from International Application No. PCT/US2016/018905, dated Feb. 8, 2017, 8 pp.
Wiegand, T., et al., "WD2: Working Draft 2 of High-Efficiency Video Coding," Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012], 153 pp.
Wiegand, T., et al., "WD3: Working Draft 3 of High-Efficiency Video Coding," Document JCTVC-E603, 5th Meeting: Geneva, CH, Mar. 16-23, 2011, 160 pages.
Wiegand T., et al.,"WD1: Working Draft 1 of High-Efficiency Video Coding," JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.

* cited by examiner

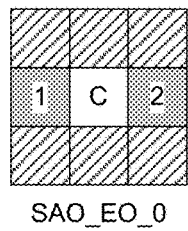 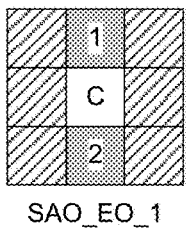 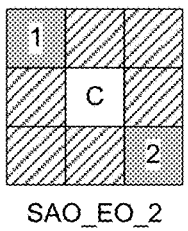 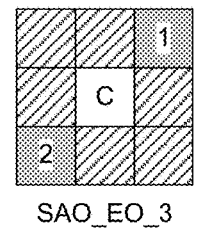
SAO_EO_0  SAO_EO_1  SAO_EO_2  SAO_EO_3
FIG. 2A  FIG. 2B  FIG. 2C  FIG. 2D
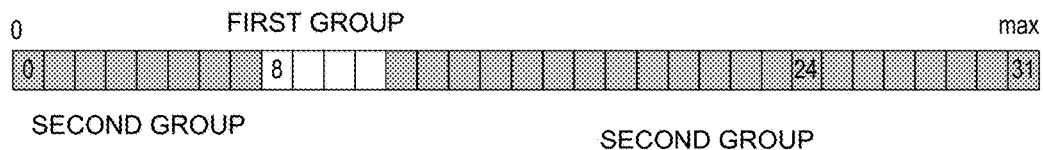
FIG. 3

LOW COMPLEXITY SAMPLE ADAPTIVE OFFSET (SAO) CODING

This Application is a continuation of U.S. application Ser. No. 14/856,192 filed Sep. 16, 2015, which claims the benefit of U.S. Provisional Patent Application 62/129,628 filed Mar. 6, 2015, the entire content of U.S. Provisional Patent Application No. 62/129,628 being incorporated herein by reference.

TECHNICAL FIELD

This disclosure relates to video encoding and, more particularly, to techniques for sample adaptive offset (SAO) offset coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized ITU-T H.265, High Efficiency Video Coding (HEVC) standard, and the various HEVC extensions presently under development. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques related to sample adaptive offset (SAO) filtering, and more particularly, this disclosure describes techniques for reducing complexity associated with deriving SAO information in a video encoding process.

In one example, a method of encoding video data includes encoding video data according to a set of sample adaptive offset (SAO) types; performing a plurality of coding passes to test a subset of the SAO types for a first block of video data, wherein the subset is smaller than the set; selecting from the subset of SAO types an SAO type for the first block of video data; and generating for inclusion in an encoded bitstream, information for identifying the selected SAO type for the first block.

In one example, a device for encoding video data includes a memory configured to store video data and one or more processors configured to encode video data according to a set of sample adaptive offset (SAO) types; perform a plurality of coding passes to test a subset of the SAO types for a first block of video data, wherein the subset is smaller than the set; select from the subset of SAO types an SAO type for the first block of video data; and generate for inclusion in an encoded bitstream, information for identifying the selected SAO type for the first block.

In another example, an apparatus for encoding video data includes means for encoding video data according to a set of sample adaptive offset (SAO) types; means for performing a plurality of coding passes to test a subset of the SAO types for a first block of video data, wherein the subset is smaller than the set; means for selecting from the subset of SAO types an SAO type for the first block of video data; and means for generating for inclusion in an encoded bitstream, information for identifying the selected SAO type for the first block.

In another example, a computer readable storage medium stores instructions that when executed by one or more processors cause the one or more processors to encode video data according to a set of sample adaptive offset (SAO) types; perform a plurality of coding passes to test a subset of the SAO types for a first block of video data, wherein the subset is smaller than the set; select from the subset of SAO types an SAO type for the first block of video data; and generate for inclusion in an encoded bitstream, information for identifying the selected SAO type for the first block.

The details of one or more examples of the disclosure are set forth in the accompanying drawings and the description below. Other features, objects, and advantages will be apparent from the description, drawings, and claims.

BRIEF DESCRIPTION OF DRAWINGS

FIGS. 2A, 2B, 2C and 2D are conceptual diagrams illustrating example edge offset classifications for sample adaptive offset coding.

FIG. 3 is a conceptual diagram illustrating example band offset classifications for sample adaptive offset coding.

DETAILED DESCRIPTION

Figure 1:
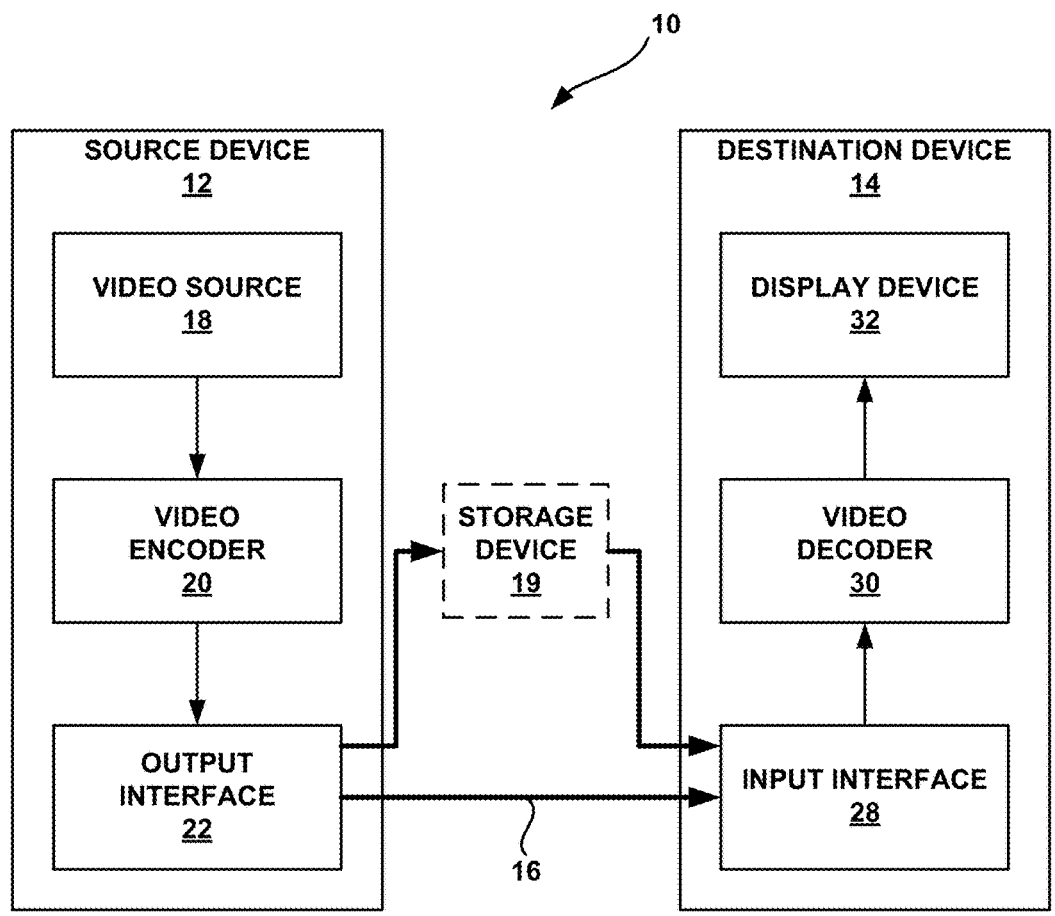
FIG. 1 is a block diagram illustrating an example video encoding and decoding system that may utilize the techniques described in this disclosure.

This disclosure describes techniques related to sample adaptive offset (SAO) filtering, and more particularly, this disclosure describes techniques for reducing complexity associated with deriving SAO information in a video encoding process. As will be described in more detail below, SAO information as used in this disclosure generally refers to one or both of an offset type and offset values. SAO filtering is a type of loop filtering used in video coding. In general, the addition of offset values to pixels in a video frame (e.g., a reconstructed image) may in some instances improve coding without greatly increasing the bit overhead needed to store or transmit encoded video data. The improvement in coding that potentially results from SAO filtering may be, for example, that a better rate-distortion (RD) tradeoff may be achieved when encoding the video data, and/or that a decoded video image contains less distortion relative to an original video image for a given bit rate. SAO techniques allow for different offset values to be applied to different pixels (or blocks of pixels) depending on pixel (or block) classification metrics, such as edge metrics, band metrics, or other types of metrics.

In some implementations, an SAO filter unit may be configured to perform two types of SAO filtering, generally referred to in this disclosure as band offset filtering and edge offset filtering. An SAO filter unit may also at times apply no offset, which as will be explained in more detail below, can itself be considered a third type of SAO filtering. The type of offset filtering applied by an SAO filter may be either explicitly or implicitly signaled to a video decoder. When applying edge offset filtering, pixels can be classified based on edge information of a coding unit, and an offset can be determined for pixels based on the edge classification. As will be explained in greater detail below, there are typically four variations of edge-based SAO, where the value of a pixel is compared to two of the pixel's eight neighboring pixels. Which two pixels are used for comparison depends on which variation of edge-based offset is used. Based on the magnitude difference of the pixel relative to the neighboring pixels, an offset is added to the pixel value.

When applying band offset filtering, pixels can be classified into different bands based on a pixel value, such as an intensity value, with each band having an associated offset. A band includes a range of pixel values. For example, pixel values ranging from 0 to 255 may be divided into 32 equal bands (labeled 0 to 31), such that pixel values 0-7 are a first band, pixel values 8-15 are a second band, pixel values 16-23 are a third band, and so on for all thirty-two bands. The bands can be used for determining which particular offset value, of a plurality of different offset values, to apply to a pixel or group of pixels. For example, if a pixel has a value of 10 (which is within the second band, i.e. values 8-15, in the example above), then an offset associated with the second band can be added to the pixel value.

For purposes of signaling and generating the offsets for the various bands, the bands may be grouped into two or more groups. For band offset filtering, pixels may, for example, be categorized into thirty-two bands (bands 0-31) as described above, and the bands may be grouped into two groups (e.g., two groups of sixteen bands, one group of four bands and one group of twenty-eight bands, one group of eight bands and one group of twenty-four bands, or other such groupings). The groupings of bands can be used for determining the order in which the offset values for the bands are signaled in the encoded video bitstream, and/or can be used to determine if a particular band has an offset value other than zero. Offsets for the bands may be signaled using differential coding techniques in which a current value is signaled as a difference between the current value and a previous value. In order to reduce signaling overhead, only a small number of bands (e.g. four bands) may be associated with non-zero offset values, while all other bands are assumed to have an offset value of zero.

As implemented in the High Efficiency Video Coding (HEVC) standard, SAO filtering may be enabled and disabled at the slice level, and furthermore, SAO filtering may be enabled and disabled separately for luma and chroma samples. For example, for a particular slice of video data, both luma and chroma samples may be SAO filtered; neither luma nor chroma samples may be SAO filtered; or one of luma and chroma samples may be SAO filtered while the other is not. When SAO filtering is enabled for a slice, then SAO type and offset values are signaled at a largest coding unit (LCU) level. As introduced above, the SAO type can include band offset filtering, edge offset filtering, or no SAO filtering. Thus, even if SAO filtering is enabled for a particular slice, some LCUs of that slice may not be SAO filtered (i.e. some LCUs will have an SAO type of no SAO filtering). In some instances, the SAO type and the offset values may be signaled with a series of merge flags, where a true value for a first merge flag indicates the offset type and the offset values for the LCU are inherited from a left neighboring LCU, and a true value for a second merge flag indicates the SAO type and the offset values are inherited from an above neighboring LCU. If both merge flags are false, then a new SAO type and new offset values are sent for the LCU.

It should be understood that although HEVC enables and disables SAO filtering at a slice level and signals SAO information at an LCU level, it is contemplated that the techniques of this disclosure may be implemented in SAO configurations where such signaling occurs at a different level or in SAO configurations that use different signaling mechanisms altogether.

SAO information (e.g. an SAO type and a plurality of offset values) is signaled for an LCU. Based on the SAO type, a video decoder determines on a pixel-by-pixel basis which offset value from the plurality of offset values to add for each pixel. As will be explained in greater detail below, the determination of which offset value to apply for a particular pixel or block of pixels (e.g. a 2×2 block in the LCU) may be determined based on the edge and band classifications determined for the particular pixel of block of pixels.

As mentioned above, the addition of offset values to pixels in a video frame may improve the quality of reconstructed video quality without greatly increasing the bit overhead needed to store or transmit encoded video data. SAO may, however, greatly increase video encoder complexity. A video encoder determines how to encode a particular portion of video data by performing multiple coding passes, with each coding pass utilizing different coding tools (e.g. predictive modes, transform modes, filters) or utilizing the same coding tools but with different parameters. As used in this disclosure, a coding pass generally refers to either fully or partially encoding a portion of video data with a certain set of coding tools and parameters in order to test (e.g. analyze the achieved RD tradeoff for) those coding tools and parameters. Based on the multiple coding passes, the video encoder determines a set of coding tools and coding parameters that provide a desirable RD tradeoff. As SAO includes multiple SAO types, each of which can be implemented with multiple offset values, a video encoder may have to engage in computationally complex processing to determine which SAO type and which offset values to use for a particular block of video. This disclosure introduces techniques that may potentially reduce the complexity of determining SAO information.

In describing various techniques, this disclosure may use terms such as first, second, third, etc. to differentiate between blocks, pixels, SAO information, etc. Unless stated to the contrary, such terms should not be assumed to imply ordinal relationship, temporal relationship, or other such relationship. Instead, such terms are merely labels used to differentiate different blocks, pixels, SAO information, etc.

FIG. 1 is a block diagram illustrating an example video encoding and decoding system 10 that may utilize the SAO encoding techniques described in this disclosure. As shown in FIG. 1, system 10 includes a source device 12 that generates encoded video data to be decoded at a later time by a destination device 14, and as will be described in more detail below, this encoding and decoding of video data may include coding offset values for use in SAO filtering. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 19. Similarly, encoded data may be accessed from storage device 19 by input interface. Storage device 19 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 19 may correspond to a file server or another intermediate storage device that may hold the encoded video generated by source device 12. Destination device 14 may access stored video data from storage device 19 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 19 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 19 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 19, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the recently finalized HEVC standard (and various extensions thereof presently under development). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more integrated circuits including microprocessors, digital signal processors (DSPs), application specific integrated circuits (ASICs), field programmable gate arrays (FPGAs), discrete logic, software, hardware, firmware, or any combinations thereof. When the techniques are implemented partially in software, a device may store instructions for the software in a suitable, non-transitory computer-readable medium and execute the instructions in hardware such as integrated circuitry using one or more processors to perform the techniques of this disclosure. Each of video encoder 20 and video decoder 30 may be included in one or more encoders or decoders, either of which may be integrated as part of a combined encoder/decoder (CODEC) in a respective device.

As introduced above, the JCT-VC has recently finalized development of the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a LCU. The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block.

Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RB SP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RB SP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

SAO coding has been included in the base HEVC standard. In general, the addition of offset values to pixels in a video frame may improve the quality of reconstructed video quality without greatly increasing the bit overhead needed to store or transmit encoded video data. SAO techniques allow for different offset values to be applied to different pixels (or blocks) depending on pixel (or block) classification metrics. Possible classification metrics include band metrics and activity metrics such as edge metrics. As SAO is implemented in the HEVC standard, each LCU can have one of three SAO types, which may also be referred to as pixel classifications. The three SAO types are no offset, band-type SAO, and edge-type SAO.

FIGS. 2A-2D are conceptual diagrams showing the four edge offset classifications included in HEVC. The edge offset type classifies each pixel based on edge information. For each of the edge classifications shown in FIGS. 2A-2D, an edge type for the current pixel is calculated by comparing the value of the current pixel (C) to the values of neighboring pixels (1 and 2). For SAO edge offset of classification zero (SAO_EO_0) shown in FIG. 2A, the current pixel (pixel C) is compared to the left neighbor pixel (pixel 1) and the right neighbor pixel (pixel 1). For SAO edge offset of classification one (SAO_EO_1) shown in FIG. 2B, the current pixel (pixel C) is compared to the top neighbor pixel (pixel 1) and the bottom neighbor pixel (pixel 2). For SAO edge offset of classification two (SAO_EO_2) shown in FIG. 2C, the current pixel (pixel C) is compared to the upper left neighbor pixel (pixel 1) and the bottom right neighbor pixel (pixel 2). For SAO edge offset of classification three (SAO_EO_3) shown in FIG. 2D, the current pixel (pixel C) is compared to the upper right neighbor pixel (pixel 1) and the bottom left neighbor pixel (pixel 2).

The four edge offset classifications can each have an edge type with 5 possible integer values ranging from −2 to 2. Initially, the edge type of the current pixel is assumed to be zero. If the value of current pixel C is equal to values of both the first neighbor pixel (pixel 1) and the second neighbor pixel (pixel 2), the edge type remains at zero. If the value of the current pixel C is greater than the value of neighbor pixel 1, the edge type is increased by one. If the value of the current pixel C is less than the value of neighbor pixel 1, the edge type is decreased by one. Likewise, if the value of the current pixel C is less than the value of neighbor pixel 2, the edge type is increased by one, and if the value of the current pixel C is less than the value of the neighbor pixel 2, the edge type is decreased by 1.

As such, the current pixel C may have an edge type of −2, −1, 0, 1, or 2. The edge type is −2 if the value of current pixel C is less than both values of neighbor pixels 1 and 2. The edge type is −1 if the value of current pixel C is less than one neighbor pixel, but equal to the other neighbor pixel. The edge type is 0 if the value of current pixel C is the same as both neighbor pixels, or if the value of current pixel C is greater than one neighbor pixel, but less than the other neighbor pixel. The edge type is 1 if the value of the current pixel C is greater than one neighbor pixel, but equal to the other neighbor pixel. The edge type is 2 if the value of the current pixel C is greater than both values of neighbor pixels 1 and 2. For each non-zero edge type value, four offset values are determined and signaled in the encoded video bitstream for use by a decoder (i.e., $eoffset_{-2}$, $eoffset_{-1}$, $eoffset_{1}$, $eoffset_{2}$).

In view of the above description, for each edge offset classification, edge type values may be computed for a pixel according to the following pseudocode:

```
EdgeType = 0;
if (C > Pixel 1) EdgeType = EdgeType + 1;
if (C < Pixel 1) EdgeType = EdgeType − 1;
if (C > Pixel 2) EdgeType = EdgeType + 1;
if (C < Pixel 2) EdgeType = EdgeType − 1;
```

If video decoder 30 determines that a pixel has an edge type of −2, then video decoder 30 adds the offset value $eoffset_{-2}$ to the pixel. If video decoder 30 determines that a pixel has an edge type of −1, then video decoder 30 adds the offset value $eoffset_{-1}$ to the pixel. If video decoder 30 determines that a pixel has an edge type of 1, then video decoder 30 adds the offset value $eoffset_{1}$ to the pixel. If video decoder 30 determines that a pixel has an edge type of 2, then video decoder 30 adds the offset value $eoffset_{2}$ to the pixel.

FIG. 3 is a conceptual diagram showing example bands that may be used in band-based SAO classification. Each rectangle in FIG. 3 represents a band. The example of FIG. 3 shows 32 bands, i.e., bands 0-31. Some of the bands, such as band 0, band 8, band 24, and band 31 have been labeled. In some implementations, more or fewer bands may be used. For band-based offset, pixels are classified into different bands based on pixel values, such as intensity values. For purposes of example, assume pixel values range from 0-255 (e.g. 8-bit bitdepth), although other ranges such as 0-1023 (e.g. 10-bit bitdepth) may also be used. In such an example, the maximum value shown in FIG. 3 would be equal to 255, and each of the thirty-two bands shown in FIG. 3 would have a range of 8. The left-most band (i.e. band 0 in FIG. 3) would be pixel values 0-7, the next band (i.e. band 1 in FIG. 3) would be for pixel values of 8-15, the next band (i.e. band 2) would be for pixel values 16-23, and so on, until the right most band (i.e. band 31 in FIG. 3) which would be for pixel values 248-255. For band offset, pixels are classified into different bands based on a pixel value such as an intensity value. Separate classifications may be used for luma and chroma. Based on which band a pixel value falls in, an offset is added to the pixel. For example, if a pixel has a value of 19, then according to this current example, the pixel value falls within band 2 which ranges from pixel value 16 to 23. Thus, video decoder 30 would apply an offset associated with band 2 to the pixel value of 19.

For purposes of signaling the offset values associated with each of the bands, video encoder 20 may group the bands into two or more groups. The two groups may, for example, be a first group of bands with signaled offset values (e.g. bands 8-11 in the example of FIG. 3) and a second group of bands with non-signaled offset values. The signaled offset values may be either zero or non-zero values, while video decoder 30 infers all the non-signaled values to be zero. For the first group of bands with signaled offset values, video encoder 20 may signal to video decoder 30 offset values (i.e., $boffset_{0}$, $boffset_{1}$, $boffset_{2}$, $boffset_{3}$,) as well as an indication of the first band with a signaled offset value. For the first band with a signaled offset value and the next three bands in sequential order following the first band, video encoder 20 signals offset value to video decoder 30. For the remaining bands, video decoder 30 may infer without signaling that the bands have an offset value of zero.

For each LCU, video encoder 20 may perform multiple coding passes using band-type SAO, edge-type SAO (e.g. SAO_EO_0, SAO_EO_1, SAO_EO_2, SAO_EO_3), and without using SAO. For band-type SAO, video encoder 20 performs multiple coding passes using different groupings of bands as well as different values for each band (e.g. different values for $boffset_{0}$, $boffset_{1}$, $boffset_{2}$, $boffset_{3}$,), and for each edge-type SAO, video encoder 20 also performs multiple coding passes using different offset values (e.g. different values for $eoffset_{-2}$, $eoffset_{-1}$, $eoffset_{1}$, $eoffset_{2}$). Performing this large number of coding passes for every LCU can be computationally intensive. This disclosure introduces techniques for low complexity SAO encoding which may reduce the complexity associated with determining SAO information for an LCU.

This disclosure includes technique that may reduce the complexity of each offset derivation. According to an example technique, video encoder 20 may only check a subset of offset types, rather than all offset types. In other words, video encoder 20 may only perform coding passes to evaluation a subset of the offset types, rather than all offset types. As discussed above, in SAO as implemented in HEVC, there are five offset types (1 band offset and 4 edge offset types including vertical, horizontal, 45 degree, and 135 degree). Video encoder 20 may also encode SAO information using merge mode from left or upper LCUs, which includes copying SAO information from one of those LCUs.

According to the techniques of this disclosure, video encoder 20 may be configured to encode video data in multiple modes including, for example, a fast coding mode and a high compression mode. The high compression mode may provide better compression at a comparable distortion level compared to the fast coding mode, but the high compression mode may also take longer to encode the video data than the fast coding mode. The fast coding mode may sacrifice a certain amount of compression quality in order to encode the video data more quickly. In the fast encoding mode, video encoder 20 may only check, e.g., perform coding passes for, a subset of the SAO types, i.e., less than all SAO types, while in the high compression mode, video encoder 20 may perform coding passes for all of the SAO types. In general, the term subset, as used herein, will refer to a number of SAO types that is less than a total number of all SAO types. As one example, in the fast encoding mode, video encoder 20 may only perform coding passes for band-type offset, horizontal edge offset, and vertical edge offset, while in the high compression coding mode, video encoder 20 may perform coding passes for all five SAO types, i.e., band-type SAO and the four edge-type SAO types.

In some examples, video encoder 20 may check (e.g. perform coding passes for) all five SAO types for some blocks and only check a subset of the five SAO types (i.e., less than all five of the SAO types, such as only one, two, three or four SAO types) for other blocks. In some examples, video encoder 20 may check all five SAO types for one block, and then use the determined SAO type for that block to determine a subset of SAO types to check for neighboring blocks. That is, the members of the subset of SAO types for which coding passes are performed for neighboring blocks may be selected based on the particular SAO type determined for the block.

According to one example, video encoder 20 may be configured to check only a subset of SAO types (i.e., 2 luma edge offset types such as vertical and horizontal) and/or only check SAO types for luma. By using these techniques, as much as 70% of the complexity associated with determining SAO information by an encoder may be saved.

The various techniques described in this disclosure may be applied differently for each slice or picture. As one example, for one slice or picture, video encoder 20 may determine SAO type by checking all five SAO types for each LCU, while for other slices or pictures video encoder 20 may only check a subset of the SAO types. In one example, video encoder 20 may determine whether to check all SAO types or a subset of the SAO types based on a slice type or picture type. For example, for a random access picture, video encoder 20 may check all SAO types, but for one or more other pictures only check a subset of SAO types. As another example, for non-reference pictures, video encoder 20 may check only a subset of SAO types, but for reference pictures, video encoder 20 may check all (or a larger subset of) SAO types. Hence, the set of SAO types checked for non-reference pictures may be smaller than the set of SAO types checked for reference pictures. As yet another example, video encoder 20 may determine whether to check all SAO types or a subset of SAO types based on whether a frame, i.e., picture, is an I-picture, P-picture, or B-picture. Hence, the sets of SAO types checked for I-pictures, P-pictures and B-pictures may be different, e.g., larger or smaller, for one another, and determined based on picture type. In one example, the sets of SAO types for P-pictures and B-pictures may be the same, but different for I-pictures. In another example, the sets of SAO types may be different for each of the I-pictures, P-pictures and B-pictures. In another example, the sets of SAO types may be the same for the I-pictures and P-pictures, but different for B-pictures. In another example, the sets of SAO types may be the same for the I-pictures and B-pictures but different for the P-pictures.

According to another technique of this disclosure, video encoder 20 may be configured to use a subset of pixels within an LCU to derive offsets. Typically, a video encoder 20 uses all pixels within an LCU to derive offset values, but according to techniques of this disclosure, video encoder 20 may use only partial pixels within an LCU. As one example, video encoder 20 may select a subset of pixels that does not include any boundary pixels and use that subset of pixels to derive offset values. In order to make offset derivations compatible with common software acceleration schemes (e.g., ARM NEON, DSP special instructions, PC SSE), this disclosure also proposes making the subset a multiple of 8 pixels (e.g. 8, 16, 24, 32, 40). Most software acceleration schemes are configured to handle eight pixels at a time; so using multiples of 8 may lead to improved performance.

Figure 4A:
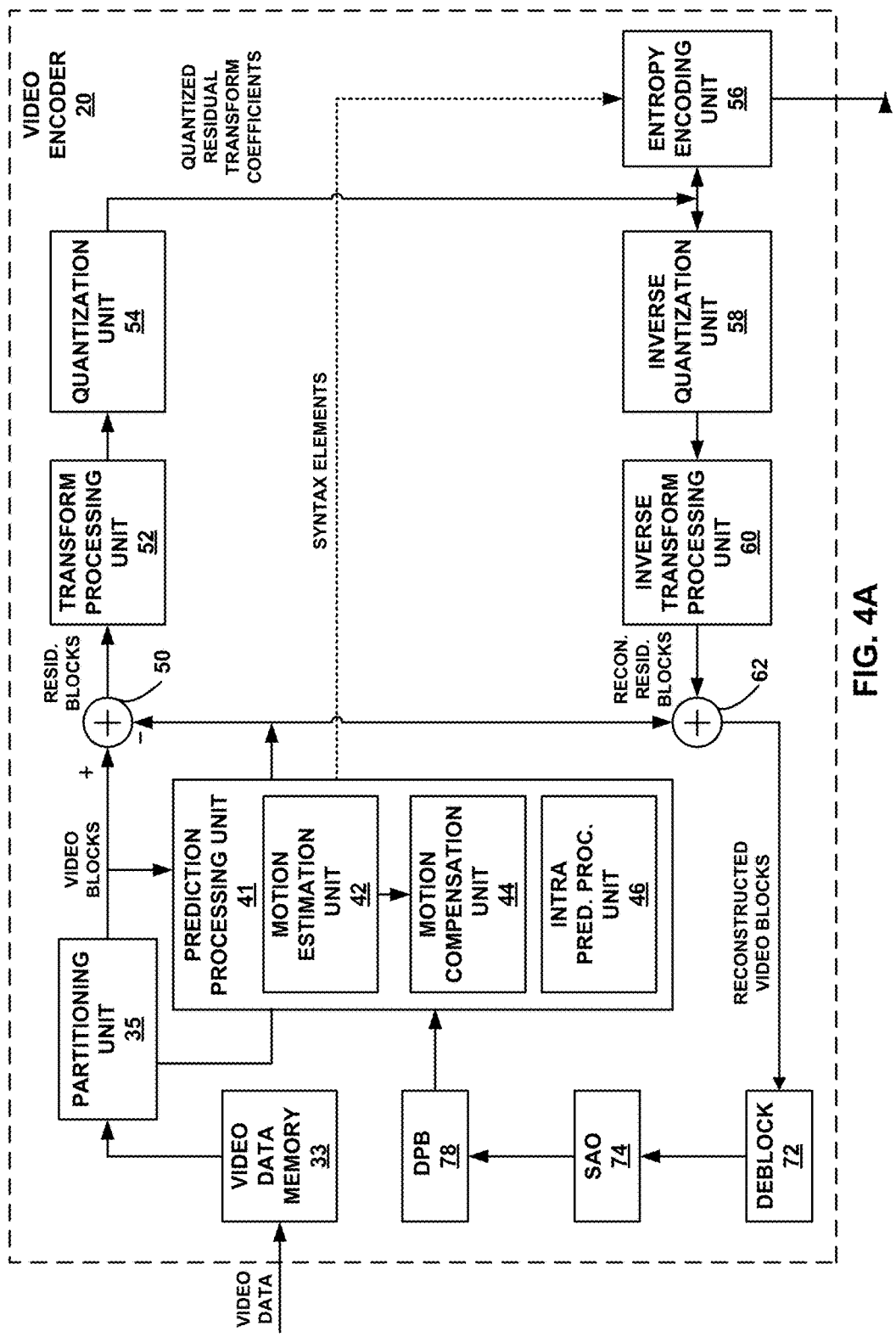
FIG. 4A is a block diagram illustrating an example video encoder that may implement the techniques described in this disclosure.

According to another technique of this disclosure, video encoder 20 may be configured to use pre-deblocked pixels for offset derivation. Typically, video encoders are configured to use post-deblocked pixels to derive offsets. Referring to FIG. 4A, and example of a pre-deblocked image would be the reconstructed image output from summer 62 before being deblock filtered by deblock filtering 72. An example of a post-deblocked image would be the an image output from deblock filtering 72 after being deblock filtered. To perform de-blocking on a lower boundary of a block and a right boundary of a block, however, video encoder 20 needs to have determined how to encoded the right neighboring block and the below neighboring block. According to the techniques of this disclosure, video encoder 20 may determine which SAO information to use for a block by analyzing only pre-deblocked pixels for the block, or by analyzing deblocked pixels for the upper and left borders of the block but only pre-deblocked pixels (e.g. pixels that have be deblock filtered) for the right and lower boundaries of the block. Configuring video encoder 20 derive offset values using pre-deblocked pixels may improve dependency issues within hardware pipeline structures.

According to another technique of this disclosure, for band-type SAO, video encoder 20 may perform simplified band offset center derivation. Typically, when deciding a center of band offset, a video encoder performs full RD analysis for all possible center values (i.e., 32 positions). According to the techniques of this disclosure, video encoder 20 may use a histogram to derive band offset center (i.e., histogram center). Video encoder 20 may also determine band offset value(s) for a subset of bands out of the four adjacent bands, depending on histogram shape, for example, peakedness (kurtosis).

This disclosure also introduces techniques for reducing the number of offset derivations, i.e., reducing the number of different values that are tested for $boffset_{0-3}$ and $eoffset_{-2-2}$. Video encoder 20 may be configured to reduce the number of offset derivations needed to determine SAO information by using the one or more simplifications.

According to one example, video encoder 20 may be configured to perform threshold-based regular offset early termination. In SAO, a video encoder typically derives offsets for a current LCU and compares the derived offsets with SAO merge (left/up merge) costs and chooses the offset information (i.e. either derived or merge) that provides the more desirable RD tradeoff. In many cases, however, merge modes (e.g. using the same SAO information as a neighboring block) frequently produce a better RD tradeoff than deriving new SAO information. In many instances, a determination of whether or not to use the offset information of a neighboring block may be able to be made without comparing the RD tradeoff of the neighboring SAO information to that of newly derived SAO information. According to the techniques of this disclosure, video encoder 20 may be trained with a threshold for early merge termination. The threshold may, for example, be based on how much the SAO information of the neighboring blocks improves the quality of decoded video data or how closely the decoded video resembles the original video. If the neighboring block's SAO information exceeds that threshold, then video encoder 20 may skip checking derived SAO offset information, and instead, use SAO merge mode, i.e., where SAO information from a left or top neighbor LCU is used for the current LCU. The threshold training may be performed using previous frame's statistics about merge costs and regular offset costs. In this context, cost may refer to an amount of rate increase needed to achieve a certain reduction in distortion.

According to techniques of this disclosure, video encoder 20 may also be configured to perform threshold based merge early termination. If current costs corresponding to regular offset are already good enough, video encoder 20 may skip merge computation. This threshold training may be done by using one or more previous frames' statistics about merge costs and regular offset costs.

According to another technique of this disclosure, video encoder 20 may be configured to perform forced merges for every M LCUs, where M is a predetermined number of LCU's. Video encoder 20 may be configured to use merge mode for every M LCUs so that video encoder 20 does not need to derive new offsets for every one of the LCUs (i.e., force to use merge for every other LCUs).

FIG. 4A is a block diagram illustrating an example video encoder 20 that may implement the techniques described in this disclosure. In particular, video encoder 20 may implement the techniques of this disclosure to determine SAO information for a block of video data, and video encoder 20 may include, in an encoded bitstream, syntax information indicative of the determined SAO information.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 4A, video encoder 20 includes a partitioning unit 35, prediction processing unit 41, summer 50, transform processing unit 52, quantization unit 54, entropy encoding unit 56, and decoded picture buffer (DPB) 78. Prediction processing unit 41 includes motion estimation unit 42, motion compensation unit 44, and intra prediction processing unit 46. For video block reconstruction, video encoder 20 also includes inverse quantization unit 58, inverse transform processing unit 60, summer 62, deblocking filter 72, and SAO unit 74. Although deblocking filter 72, and SAO unit 74 are shown in FIG. 4A as being in loop filters, in other configurations, deblocking filter 72 and SAO unit 74 may be implemented as post loop filters.

As shown in FIG. 4A, video encoder 20 receives video data and stores the received video data in video data memory 33. Video data memory 33 may store video data to be encoded by the components of video encoder 20. The video data stored in video data memory 33 may be obtained, for example, from video source 18. DPB 78 may be a reference picture memory that stores reference video data for use in encoding video data by video encoder 20, e.g., in intra- or inter-coding modes. Video data memory 33 and DPB 78 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 78 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the data into video blocks, e.g., as part of an inter/intra coding mode selection process. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 78. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in 78. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra prediction processing unit 46 may intra predict a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 may select an appropriate intra-prediction mode to use from the tested modes. For example, intra prediction processing unit 46 may calculate RD values using an RD analysis for the various tested intra-prediction modes, and select the intra-prediction mode having the best, or a desirable, RD characteristics among the tested modes. RD analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best, or a desirable, RD value for the block.

In any case, after selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in DPB 78. The reference block may be used by motion estimation unit 42 and motion compensation unit 44 as a reference block to inter-predict a block in a subsequent video frame or picture.

Prior to storage in DPB 78, the reconstructed residual block can be filtered by one or more filters. If desired, deblocking filter 72 may also be applied to filter the reconstructed residual blocks in order to remove blockiness artifacts. Other loop filters, such as an adaptive loop filter (either in the coding loop or after the coding loop) may also be used to smooth pixel transitions, or otherwise improve the video quality. The reference block, after being filtered by one or more of deblocking filter 72 and SAO unit 74 may be used by motion estimation unit 42 and motion compensation unit 44 as a reference block to inter-predict a block in a subsequent video frame or picture.

SAO unit 74 can determine offset values for SAO filtering in a manner that improves video coding quality. Improving video coding quality may, for example, involve determining offset values that make a reconstructed image more closely match an original image. Video encoder 20 may, for example, code the video data using multiple passes with different SAO types and different offset values and choose, for inclusion in an encoded bitstream, the SAO type and offset values that offer the best coding quality, as determined based on a desired RD tradeoff.

In some configurations, SAO unit 74 may be configured to apply two types of offset (e.g., band offset and edge offset) as described above. SAO unit 74 may also at times apply no offset, which can itself be considered a third type of offset.

The type of offset applied by SAO unit 74 may be either explicitly or implicitly signaled to a video decoder. When applying edge offset, pixels can be classified based on edge information in accordance with FIGS. 2A-2D and an offset value can be determined based on the edge classification. When applying band-based offset, SAO unit 74 can classify pixels into different bands based on a pixel value, such as an intensity value, with each band having an associated offset.

Figure 4B:
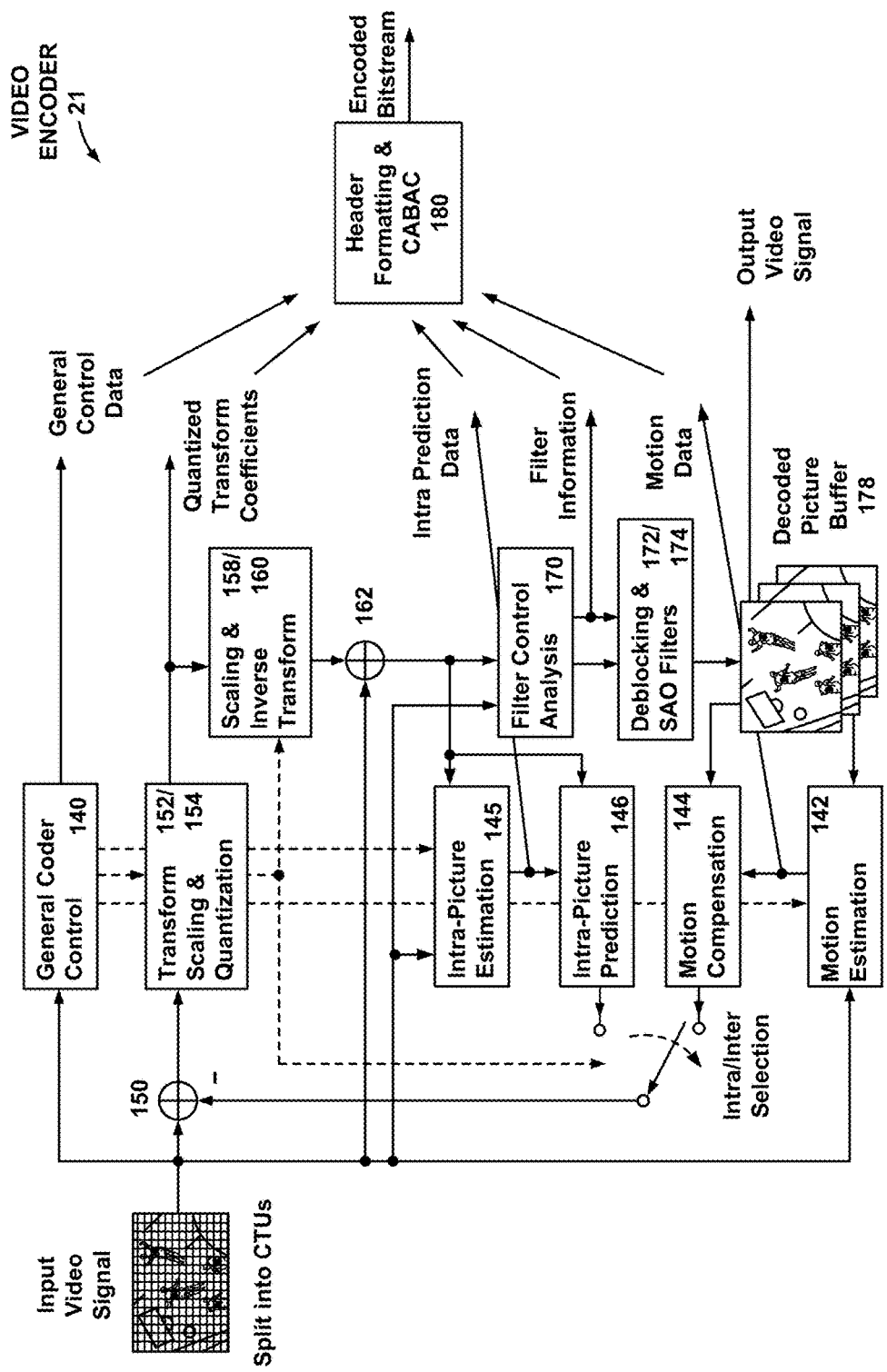
FIG. 4B is a block diagram illustrating an alternative view of an example video encoder that may implement the techniques described in this disclosure.

FIG. 4B is a block diagram illustrating an alternative view of an example video encoder 21 that may implement the techniques described in this disclosure. FIG. 4B represents a typical HEVC video encoder. Video encoder 21 includes general coder control unit 140, motion estimation unit 142, motion compensation unit 144, intra-picture estimation unit 145, intra-picture prediction processing unit 146, transform scaling and quantization unit 152/154, scaling and inverse transform unit 158/160, filter control analysis unit 170, deblocking and SAO filters 172/174, decoded picture buffer 178, and header formatting and CABAC unit 180. Each of these components generally performs the same functions as its like numbered equivalent in FIG. 4A. For example, motion estimation unit 142 generally performs the same functionality as motion estimation unit 42 in FIG. 4A, and transform scaling and quantization unit 152/154 generally performs the same functionality as transform processing unit 52 and quantization unit 54.

General coder control unit 140 selects and maintains various parameters for how video encoder 21 is to encode video data. For example, general coder control unit 140 may select the profiles, tiers, and levels of the HEVC standard to which the video data is to be coded in accordance with. General coder control unit 140 may also, for example, establish and maintain the bitrate and desired RD levels.

Video encoder 21 partitions an input video signal into video blocks (e.g. CTUs) and sends those CTUs to motion estimation unit 142 and intra-picture estimation unit 145. Motion estimation unit 142 may be configured to determine an inter-prediction mode for a block of video according to a predetermined pattern for a video sequence. Intra-picture estimation unit 145 may be configured to determine an intra prediction mode for the block of video data. Video encoder 21 selects one of the intra prediction mode or the inter prediction mode for coding the block of video data. The selected intra prediction data or motion data is sent to header formatting and CABAC unit 180, which may entropy encode the data for inclusion in the encoded bitstream.

At summer 150, video encoder 21 determines residual data by subtracting a predicted block, identified using the determined motion data or intra prediction data, from an original block. Transform, scaling, and quantization unit 152/154 transforms the residual video data into residual transform coefficients using a transform, such as a DCT or a conceptually similar transform and may convert the residual video data from a pixel domain to a transform domain, such as a frequency domain. Transform, scaling, and quantization unit 152/154 also quantizes the transform coefficients to further compress the data. The quantization process may reduce the bit depth associated with some or all of the coefficients. Transform, scaling, and quantization unit 152/154 sends the quantized transform coefficients to header formatting and CABAC unit 180, which may entropy encode the quantized transform coefficients for inclusion in the encoded bitstream.

Video encoder 21 may also include a decoding loop for determining the quality of video encoding achieved for various encoding hypotheses. In the decoding loop, scaling and inverse transform unit 158/160 apply inverse quantization and inverse transformation to reconstruct the residual block in the pixel domain. Summer 162 adds the reconstructed residual block to the predicted block found by either intra-picture prediction processing unit 146 of motion compensation unit 144 to determine a reconstructed block.

Filter control analysis unit 170 determines the filter information, including any SAO information, to be used for filtering the reconstructed blocks. Filter control analysis unit 170 sends the determined filter information to header formatting and CABAC unit 180, which may entropy encode the filter information for inclusion in the encoded bitstream. Deblocking and SAO filters 172/174 may also apply one or more filters, based on the filter information determined by filter control analysis unit 170, to the reconstructed block in order to remove blockiness artifacts and otherwise improve the video quality. As part of performing multiple coding passes, filter control analysis unit 170 may derive multiple different sets of filter information, and deblocking and SAO filters 172/174 may filter reconstructed blocks using the derived filter information as part of determining which filter information of the different sets of filter information to use for coding the blocks.

Prior to storage in DPB 178, deblocking and SAO filters 172/174 may filter the reconstructed block using the determined filter information. Thus, when coding future blocks of video data, intra-picture estimation unit 145 and motion estimation unit 142 may search for predictive blocks in the filtered, reconstructed blocks, which are the same blocks a video decoder uses for locating predictive blocks.

In a typical HEVC encoder, the video encoder must implement several new coding tools in order to generate an HEVC compliant bitstream. Among those new coding tools is SAO which may visually and objectively bring large coding gains in some coding scenarios. Designing a good SAO parameter encoding engine with reasonable complexity is an important challenge.

In accordance with the techniques introduced above, video encoder 20 and video encoder 21 represent examples of video encoders configured to encode video data according to a video coding standard that supports a set of SAO types. In this disclosure, video encoder 20/21 is intended to represent either of video encoder 20 or video encoder 21 individually or to represent a video encoder that incorporates features of both video encoder 20 and video encoder 21. Unless stated to contrary, the functions and features of video encoder 20 and video encoder 21 are not mutually exclusive. Moreover, the techniques of this disclosure are not limited to any particular type of video encoder. Video encoder 20 and video encoder 21 are two examples of video encoders that may perform the techniques of this disclosure, but video encoder 20 and video encoder 21 are not the only implementations of video encoders that may perform the techniques described herein.

In one example, for a block of pixel data, video encoder 20/21 performs a plurality of coding passes to test a subset of the SAO types with the subset being smaller than the set. Video encoder 20/21 selects from the subset of SAO types, an SAO type to encode the video data and encodes the video data according to the selected SAO type. In some examples, the set of SAO types includes a band offset type, a first edge offset type, a second edge offset type, a third edge offset type, and a fourth edge offset type.

In some examples, video encoder 20/21 codes the video data in a first coding mode that involves performing the plurality of coding passes to test the subset of the SAO types and coding the video data in a second coding mode that includes performing a plurality of coding passes to test all SAO types of the set of SAO types. For a first block of pixel data, video encoder 20/21 may perform a plurality of coding passes to test the set of SAO types, and for the first block of pixel data, video encoder 20/21 may select an SAO type to encode the first block of pixel data. For another block of pixel data, video encoder 20/21 may select the SAO types to include in the subset of the SAO types based on the SAO type selected to encode the first block of pixel data.

Video encoder 20/21 may also be configured to, for a luma block of pixel data, perform a plurality of coding passes to test one or more SAO types from a set of SAO types and selecting from the one or more SAO types, an SAO type to encode the luma block of pixel data. Video encoder 20/21 may also encode a chroma block corresponding to the luma block using the selected SAO type. In other words, video encoder 20/21 may select a luma SAO type and use the selected SAO type for chroma. In such an example, video encoder 20/21 may encode the chroma block using the selected SAO type without testing SAO types for the chroma block or after only testing a subset of SAO types (e.g., only merge candidates).

Video encoder 20/21 may also be configured to, for a block of pixel data, perform a plurality of coding passes to test coding of a subset of the pixels in the block using a plurality of SAO types and offset values, and for each coding pass, compare the subset of pixels with added offset values to corresponding pixels of an original block of video data. Based on the comparison, video encoder 20/21 selects an SAO type and associated offset values to encode the block. In some examples, the subset of pixels may include fewer than all pixels in the block of data and/or may exclude pixels on the boundary of the block. The subset of pixels may be an integer multiple of 8 pixels.

Video encoder 20/21 may also be configured to encode blocks of a first portion of video data using a set of SAO types and encode blocks of a second portion of video data using only a subset of SAO types. The subset of SAO types includes fewer than all of the SAO types in the set of SAO types. The first portion of video data may, for example, be a first slice of the video data, and the second portion of video data may be a second slice of the video data. The first portion of video data may be a first picture of the video data, and the second portion of video data may be a second picture of the video data. In another example, the first portion of video data may be a reference picture, and the second portion of video data may be a non-reference picture. In other examples, the first portion of video data may be a random access picture.

Video encoder 20/21 may also be configured to determine SAO information for a first block and add offset values to a second block using the SAO information of the first block. Video encoder 20/21 may compare the second block with the added offset values to a corresponding original block, and in response to a difference between the second block and the original block being less than a threshold amount of difference, encode the second block using the SAO information of the first block and terminating an SAO information derivation process. As part of encoding the second block using the SAO information of the first block, video encoder 20/21 comprises generating a merge flag. In response to the difference between the second block and the original block being less than the threshold amount of difference, video encoder 20/21 may terminate the SAO information derivation process prior to checking SAO information other than the SAO information of the first block. Video encoder 20/21 may dynamically determine the threshold based on a comparison of one or more previously encoded blocks to one or more corresponding original video blocks. The threshold may be based on a distortion between one or more previously encoded blocks and one or more corresponding original video blocks. The difference between the second block and the original block being less than the threshold amount of difference may correspond to a distortion between the second block and the original block being less than or equal to the distortion between the one or more previously encoded blocks and the one or more corresponding original video blocks.

Video encoder 20/21 may be configured to, for a block of pixel data, perform a plurality of coding passes to test a plurality of SAO information. The block may include pre-deblocked pixel data. Video encoder 20/21 may select from the plurality of SAO information, SAO information for encoding the video data. The block of pixel data may include pre-deblocked pixels on a right boundary of the block and/or on a bottom boundary of the block. In some examples, the block of pixel data may also include post-deblocked pixels on a left boundary of the block and/or on an upper boundary of the block.

Video encoder 20/21 may be configured to, for a block of pixels, determine a distribution of pixel values for the pixels in the block and determine a center band based on the distribution. Video encoder 20/21 may perform a plurality of coding passes including band-type SAO encoding to check M bands adjacent to the determined center band. As part of determining the distribution, video encoder 20/21 may, for pixels in the block, identify bands associated with the pixels, and as part of determining the center band, and video encoder 20/21 may, based on the identifying, determine a most frequently occurring band. Video encoder 20/21 may perform a plurality of coding passes including band-type SAO encoding to check M blocks adjacent to the determined center band and only check the M bands, where M is less than a total number of bands.

Video encoder 20/21 may also be configured to encode a plurality of blocks using an SAO encoding technique and track for the number of blocks coded using an SAO merge mode. Based on the tracking, video encoder 20/21 may determine whether to code a block of the plurality of blocks using either the SAO merge mode or a non-merge mode such that a number of times the SAO merge mode is selected exceeds a minimum threshold. For example, video encoder 20/21 may control the number of blocks using merge mode to code at least a minimum number of the blocks using merge mode. Video encoder 20/21 may determine whether to encode the plurality of blocks using either the SAO merge mode or the non-merge mode by selecting at least one out of every M blocks to be coded using the SAO merge mode, where M is an integer value. The SAO merge mode may include one or both of a left-neighbor merge mode or an above-neighbor merge mode.

Figure 5:
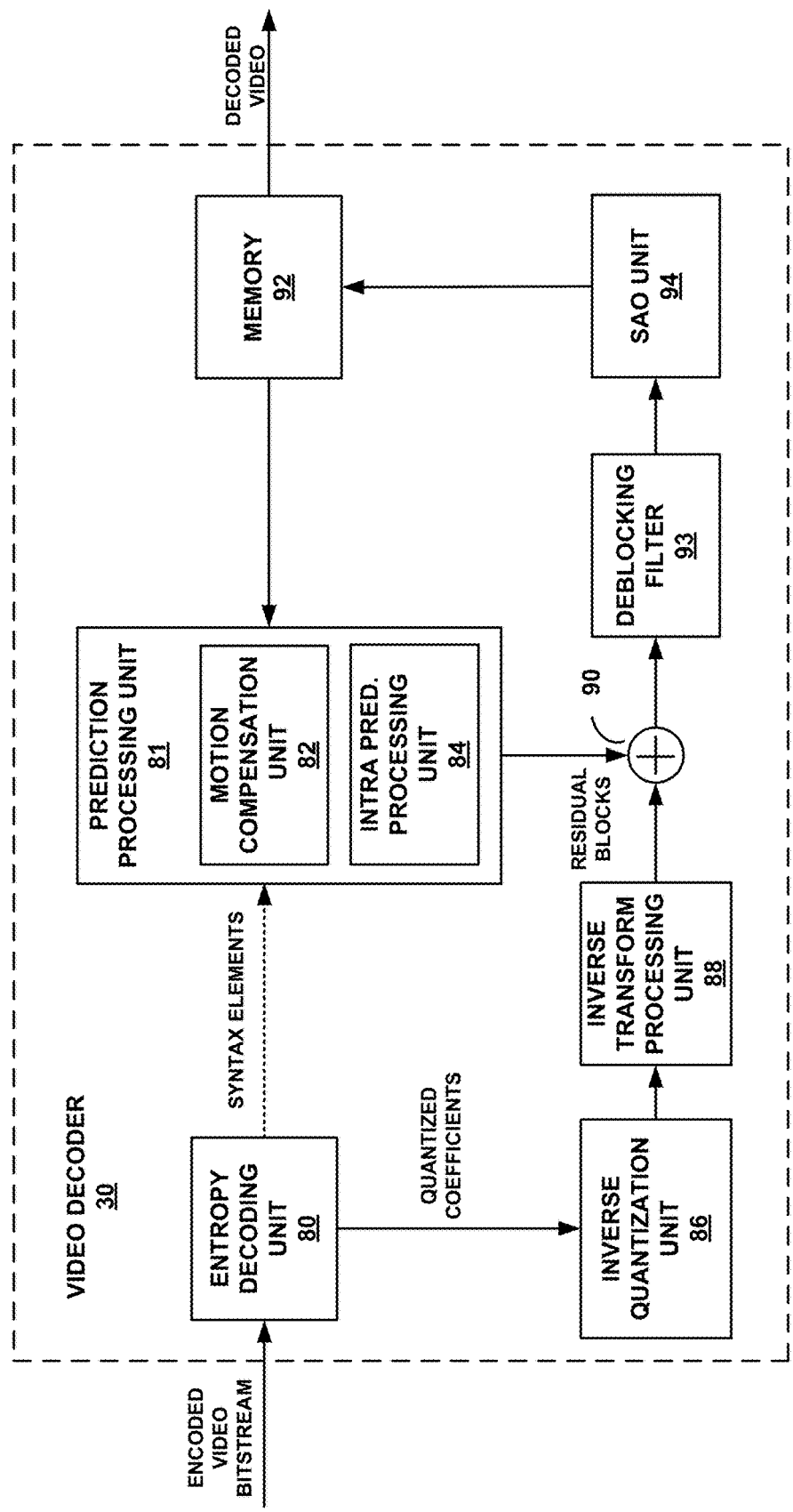
FIG. 5 is a block diagram illustrating an example video decoder that may implement the techniques described in this disclosure.

FIG. 5 is a block diagram illustrating an example video decoder 30 that may decode encoded video data according to the techniques described in this disclosure. Although video decoder 30 is presented as a video decoder configured to receive and decode video data, it should be understood that many of the techniques described with respect to video decoder 30 may also be performed by video encoder 20 or 21. Video encoder 20/21 may, for example, include a video decoding loop, and as part of performing multiple coding passes, video encoder 20/21 may encode video data and then decode the encoded video data in order to analyze the quality of the encoding.

In the example of FIG. 5, video decoder 30 includes an entropy decoding unit 80, prediction processing unit 81, inverse quantization unit 86, inverse transform processing unit 88, summer 90, deblocking filter 93, SAO unit 94, and reference picture memory 92. Prediction processing unit 81 includes motion compensation unit 82 and intra-prediction unit 84. Video decoder 30 may, in some examples, perform a decoding pass generally reciprocal to the encoding pass described above with respect to video encoder 20 or 21 of FIGS. 4A and 4B.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra-prediction unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine an inter-prediction mode used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated and signaled by video encoder 20. Video encoder 20 determines a quantization parameter for each video block. Using signaled information from video encoder 20, a quantization parameter may be determined by video decoder 30 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. The decoded video blocks formed by summer 90 can then be filtered by a deblocking filter 93, and SAO unit 94. The decoded video blocks in a given frame or picture are then stored in reference picture memory 92, which stores reference pictures used for subsequent motion compensation. Reference picture memory 92 also stores decoded video data for later presentation on a display device, such as display device 32 of FIG. 1. SAO unit 94 can be configured to apply the same filtering (e.g., edge offset and band offset) as SAO unit 74 discussed above.

FIGS. 6-13 are flow diagrams illustrating technique for determining SAO information as part of a video encoding process. The techniques of FIGS. 6-13 will be described with references to a generic video encoder. The generic video encoder may incorporate features of video encoder 20 and/or video encoder 21 or may be a different configuration of video encoder. While the techniques of FIGS. 6-13 are shown separately for ease of description, it should be understood that the various techniques described may be used in conjunction with one another, either partially or in full.

Figure 6:
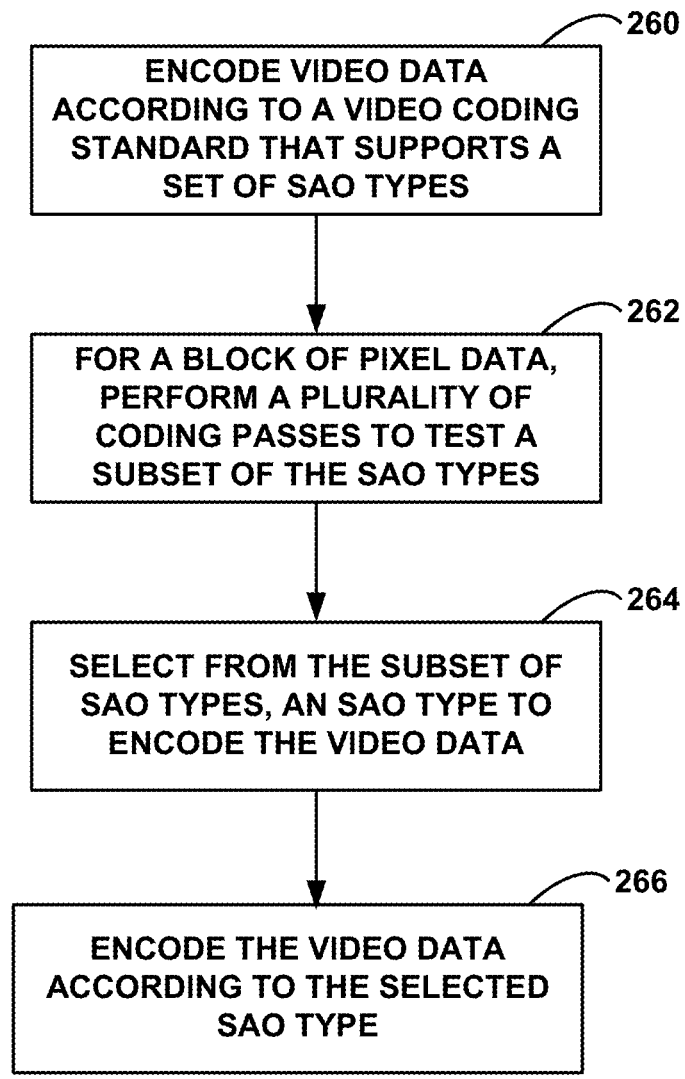
FIGS. 6-13 are flow diagrams illustrating technique for determining SAO information as part of a video encoding process.

According to the techniques of FIG. 6, the video encoder encodes video data according to a video coding standard that supports a set of SAO types (260). For a block of pixel data, the video encoder may perform a plurality of coding passes to test a subset of the SAO types (262). The subset of SAO types may be smaller, i.e., include fewer types, than the set, i.e., the full set, of SAO types. The video encoder selects from the subset of SAO types, an SAO type to encode the video data (264). The video encoder encodes the video data according to the selected SAO type (266). To code the video data according to the selected SAO type may, the video encoder may, for example, include signaling (e.g. merge signaling, difference signaling, or direct signaling) in the encoded bitstream so that a video decoder can identify the selected SAO type. Furthermore, as part of encoding the video data according to the selected SAO type, the video encoder may apply offset values to a reconstructed block of video data according to the selected SAO type. The video encoder may compare this block with the added offset values to an original block as part of analyzing a coding pass, and the video encoder may additionally store the block with the added offset values in a decoded picture buffer for use in predicting blocks of video in future frames.

Figure 7:
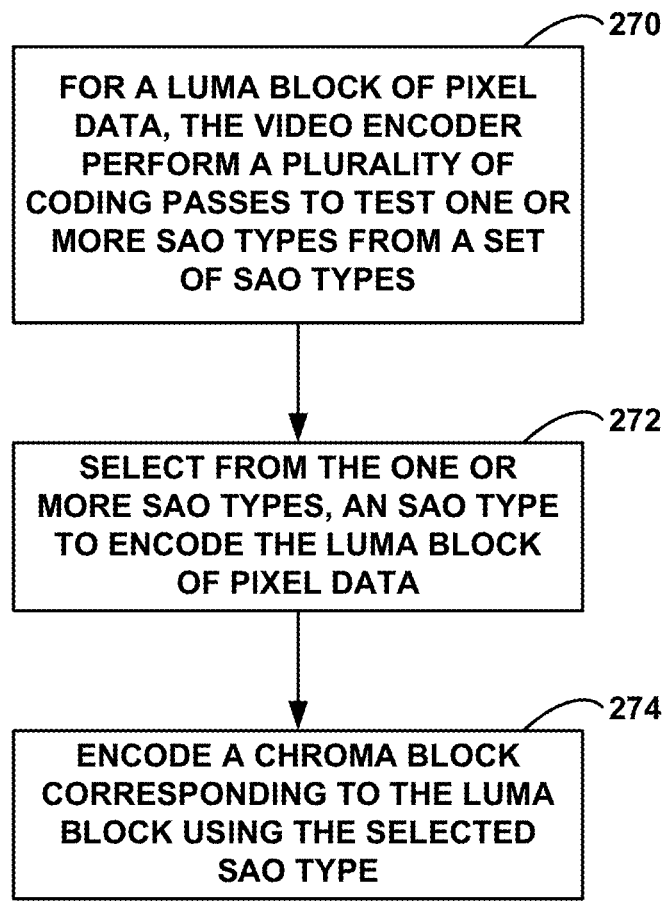

According to the techniques of FIG. 7, for a luma block of pixel data, the video encoder performs a plurality of coding passes to test one or more SAO types from a set of SAO types (270). The video encoder selects from the one or more SAO types, an SAO type to encode the luma block of pixel data (272). The video encoder encodes a chroma block corresponding to the luma block using the selected SAO type (274). Thus, rather than separately determining an SAO type for luma and chroma samples, the video encoder may determine an SAO type for luma samples of a block by, for example, performing multiple coding passes, and then use that same SAO type for encoding chroma samples of the block without performing multiple coding passes or while performing a reduced number of coding passes for encoding chroma samples.

Figure 8:
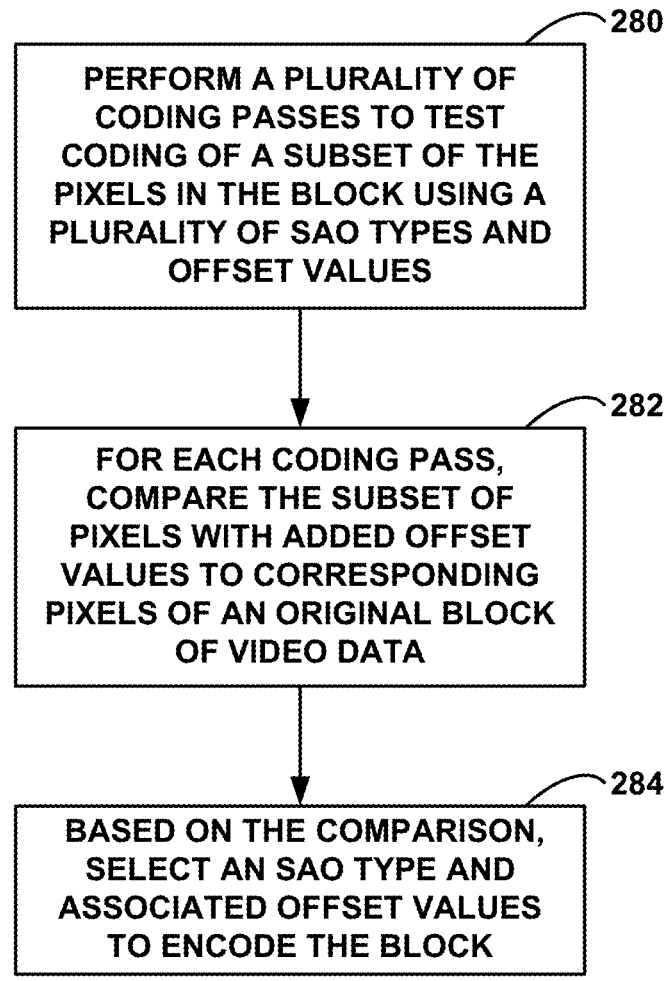

According to the techniques of FIG. 8, for a block of pixel data, the video encoders performs a plurality of coding passes to test coding of a subset of the pixels in the block using a plurality of SAO types and offset values (280). For each coding pass, the video encoder compares the subset of pixels with added offset values to corresponding pixels of an original block of video data (282). Based on the comparison, the video encoder selects an SAO type and associated offset values to encode the block (284). Thus, rather than performing coding passes and determining offset values for all pixels in a block (e.g. an LCU), the video encoder may reduce complexity by only determining offsets for a subset of the pixels and comparing only the subset to the original video data.

Figure 9:
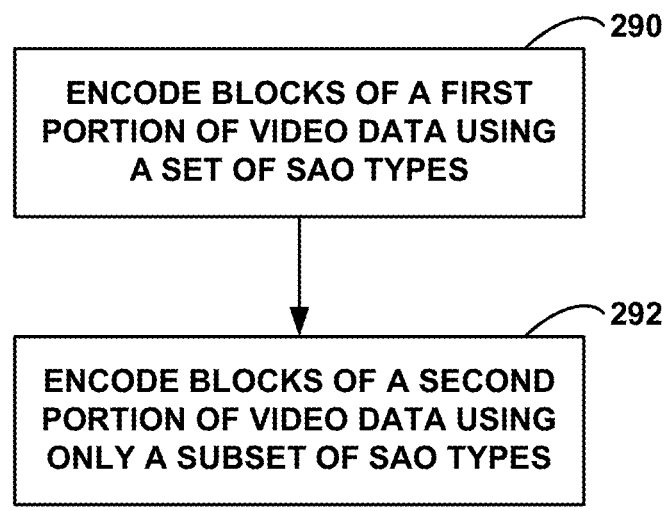

According to the techniques of FIG. 9, the video encoder encodes blocks of a first portion of video data using a set of SAO types (290). The video encoder encodes blocks of a second portion of video data using only a subset of SAO types (292). The subset of SAO types includes fewer than all of the SAO types in the set of SAO types.

Figure 10:
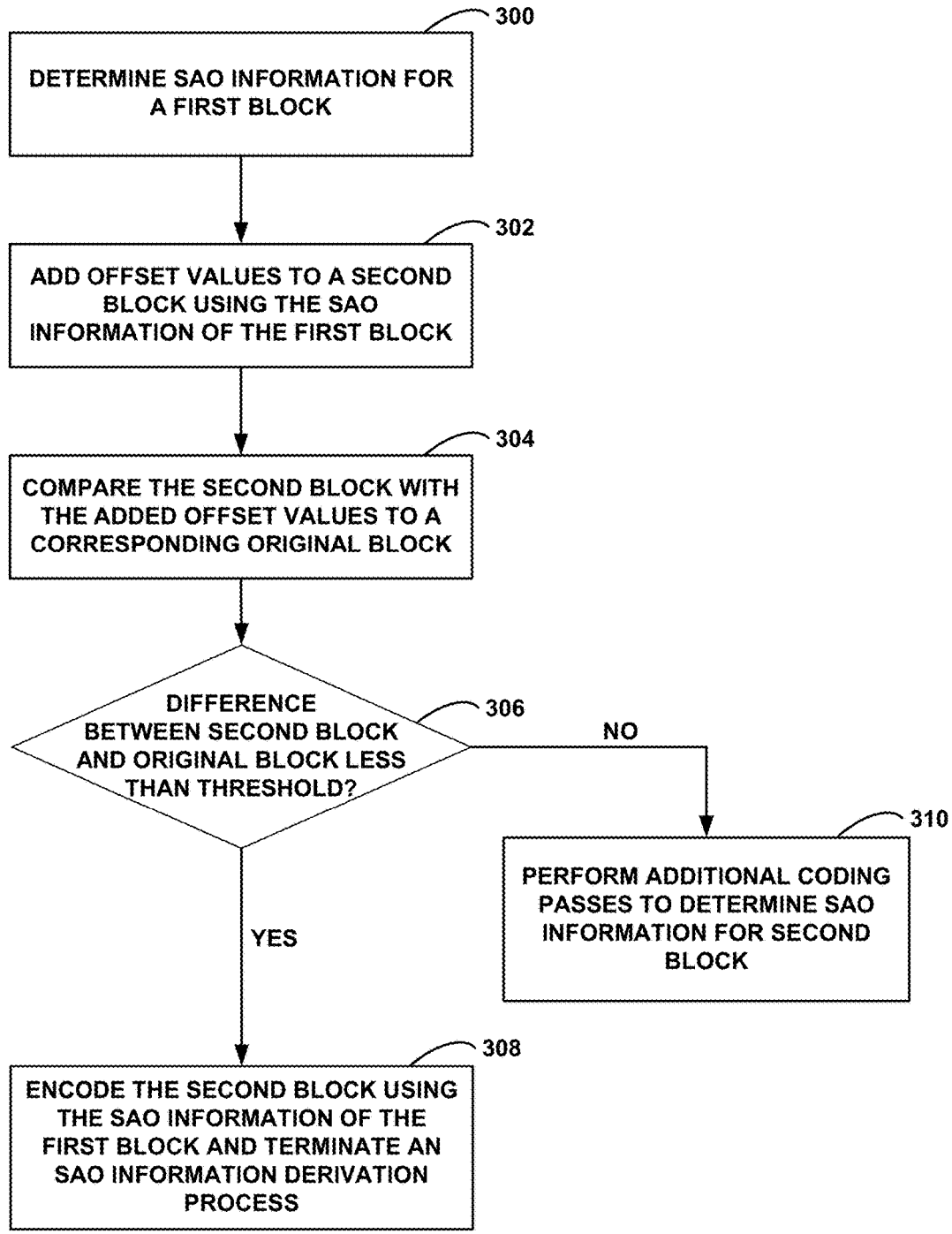

According to the techniques of FIG. 10, the video encoder determines SAO information for a first block (300). The video encoder adds offset values to a second block using the SAO information of the first block (302). The video encoder compares the second block with the added offset values to a corresponding original block (304). In response to a difference between the second block and the original block being less than a threshold amount of difference (306, YES), the video encoder encodes the second block using the SAO information of the first block and terminates an SAO information derivation process (308). The video encoder 20 may, for example, terminate the SAO information derivation process after only testing the SAO information of the first block (and possibly other already coded blocks) without performing coding passes to test SAO information derived specifically for the second block. In response to a difference between the second block and the original block not being less than a threshold amount of difference (306, NO), the video encoder performs additional coding passes to determine SAO information for the second block (310).

Figure 11:
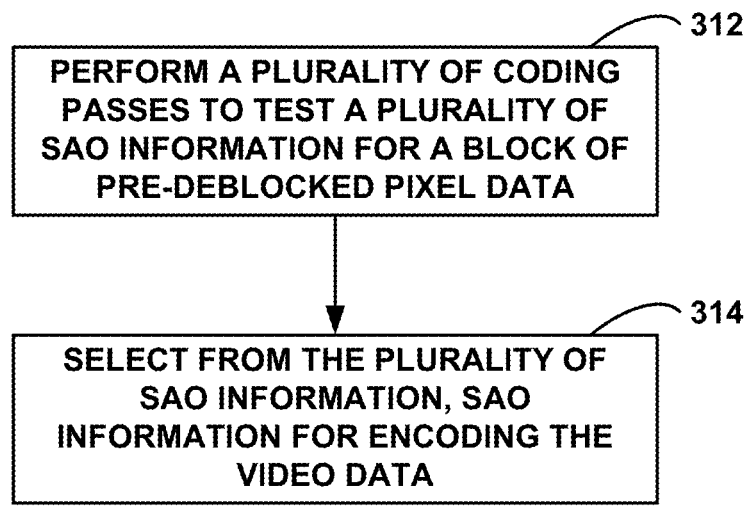

According to the techniques of FIG. 11, for a block of pixel data, the video encoder performs a plurality of coding passes to test a plurality of SAO information (312). The block comprises pre-deblocked pixel data. The video encoder selects from the plurality of SAO information, SAO information for encoding the video data (314). By using pre-deblocked pixel data, either fully pre-deblocked or partially pre-deblocked, video encoder hardware which may increase encoding speed by enabling greater parallel processing. As deblock filtering only alters border pixels, determining SAO information using pre-deblocked pixel data may not dramatically alter the quality SAO filtering.

Figure 12:
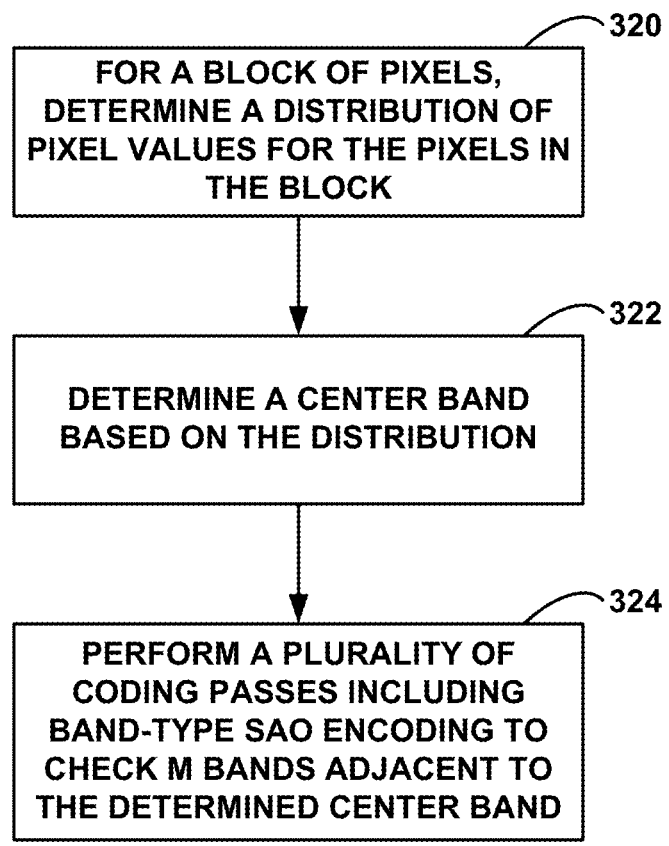

According to the techniques of FIG. 12, for a block of pixels, the video encoder determines a distribution of pixel values for the pixels in the block (320). The video encoder determines a center band based on the distribution (322). The video encoder performs a plurality of coding passes including band-type SAO encoding to check (e.g. perform coding passes for) M bands adjacent to the determined center band (324). In this example, M is an integer value. The video encoder may compare the cost (e.g. the RD tradeoff) achieved with the center band and the M bands adjacent to the center band to other types of SAO encoding (e.g. edge type SAO) to determine SAO information for a block. Thus, the video encoder may determine SAO information without checking all the bands available in band-type SAO encoding.

Figure 13:
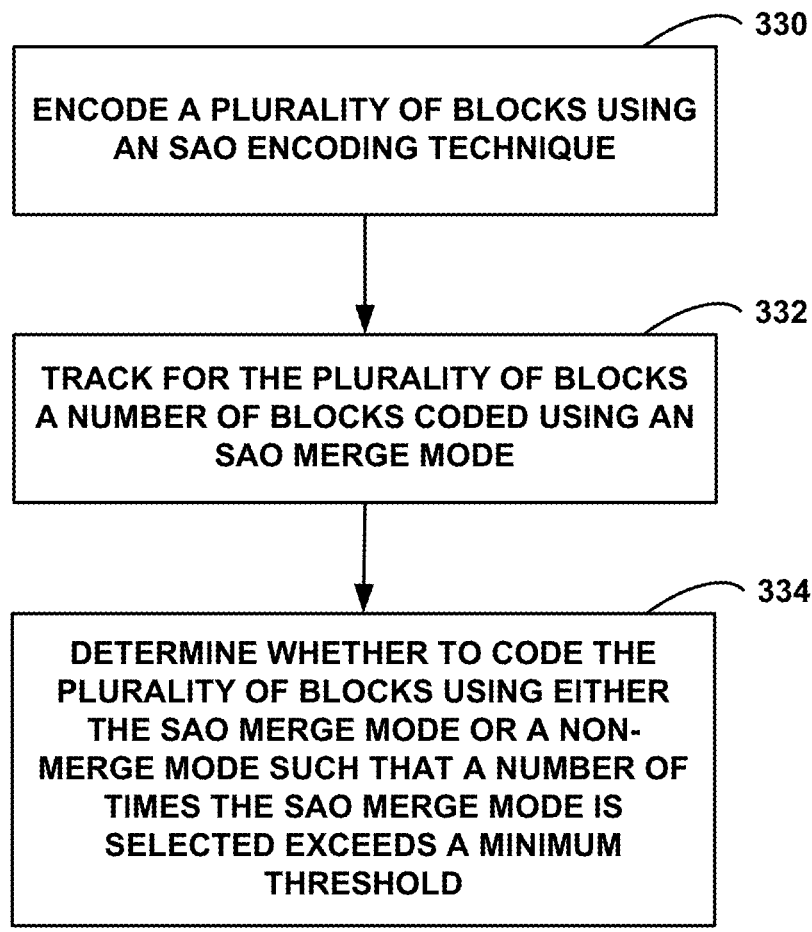

According to the techniques of FIG. 13, the video encoder encodes a plurality of blocks using an SAO encoding technique (330). The video encoder tracks for the plurality of blocks a number of blocks coded using an SAO merge mode (332). The video encoder determines whether to code a block of the plurality of blocks using either the SAO merge mode or a non-merge mode such that a number of times the SAO merge mode is selected exceeds a minimum threshold (334). When coding the block in an SAO merge mode, the video encoder may, for example, generate for inclusion in an encoded bitstream of video data one or more merge flags identifying a neighboring block for which SAO information for the block is to be copied. When coding the block in a non-merge mode, the video encoder may signal new SAO information, including both an SAO type and SAO offset values.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an IC or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
   encoding video data according to a plurality of sample adaptive offset (SAO) types;
   performing a plurality of coding passes to test the plurality of SAO types for a subset of samples for a first block of video data, wherein the subset of samples comprises fewer than all samples in the block;
   selecting from the plurality of SAO types an SAO type for the first block of video data;
   generating for inclusion in an encoded bitstream, information for identifying the selected SAO type for the first block;
   determining offset values for the first block of video data;
   adding the offset values to a second block of video data using the SAO type selected for the first block of video data;
   comparing the second block of video data with the added offset values to a corresponding original block; and
   in response to a difference between the second block of video data and the corresponding original block of video data being less than a threshold amount of difference, encoding the second block of video data using the selected SAO type and the offset values determined for the first block and terminating an SAO information derivation process.

2. The method of claim 1, wherein the plurality of SAO types includes a band offset type, a first edge offset type, a second edge offset type, a third edge offset type, and a fourth edge offset type.

3. The method of claim 1, wherein a number of samples in the subset of samples for the first block of video data is a multiple of 8.

4. The method of claim 1, wherein the first block of video data comprises a pre-deblock filtered block of video data.

5. The method of claim 1, wherein performing the plurality of coding passes to test the plurality of SAO types for the subset of samples for the first block of video data comprises performing the plurality of coding passes to test a subset of the SAO types, wherein the subset of the SAO types includes fewer SAO types than the plurality of SAO types.

6. The method of claim 1, wherein performing the plurality of coding passes to test the plurality of SAO types for the subset of samples for the first block of video data comprises performing the plurality of coding passes to test the plurality of SAO types for a luma block of the first block of video data, and selecting the SAO type from the plurality of SAO types comprises selecting the SAO type to encode the luma block of the first block of video data, the method further comprising:
   encoding a chroma block corresponding to the luma block using the selected SAO type without performing a coding pass to test any of the plurality of SAO types for the chroma block.

7. The method of claim 1, wherein encoding the second block using the selected SAO type and the offset values determined for the first block comprises generating a merge flag.

8. The method of claim 1, wherein terminating the SAO information derivation process comprises terminating the SAO information derivation process prior to checking SAO information other than the selected SAO type and the offset values determined for the first block.

9. A device for encoding video data, the device comprising:
   a memory configured to store video data; and
   one or more processors configured to:
      encode video data according to a plurality of sample adaptive offset (SAO) types;
      perform a plurality of coding passes to test the plurality of SAO types for a subset of samples for a first block of video data, wherein the subset of samples comprises fewer than all samples in the block;
      select from the plurality of SAO types an SAO type for the first block of video data;
      generate for inclusion in an encoded bitstream, information for identifying the selected SAO type for the first block;
      determine offset values for the first block of video data;
      add the offset values to a second block of video data using the SAO type selected for the first block of video data;
      compare the second block of video data with the added offset values to a corresponding original block; and
      in response to a difference between the second block of video data and the corresponding original block of video data being less than a threshold amount of difference, encode the second block of video data using the selected SAO type and the offset values determined for the first block and terminating an SAO information derivation process.

10. The device of claim 9, wherein the plurality of SAO types includes a band offset type, a first edge offset type, a second edge offset type, a third edge offset type, and a fourth edge offset type.

11. The device of claim 9, wherein a number of samples in the subset of samples for the first block of video data is a multiple of 8.

12. The device of claim 9, wherein the first block of video data comprises a pre-deblock filtered block of video data.

13. The device of claim 9, wherein to perform the plurality of coding passes to test the plurality of SAO types for the subset of samples for the first block of video data, the one or more processors are configured to perform the plurality of coding passes to test a subset of the SAO types, wherein the subset of the SAO types includes fewer SAO types than the plurality of SAO types.

14. The device of claim 9, wherein to perform the plurality of coding passes to test the plurality of SAO types for the subset of samples for the first block of video data, the one or more processors are configured to perform the plurality of coding passes to test the plurality of SAO types for a luma block of the first block of video data, and selecting the SAO type from the plurality of SAO types comprises selecting the SAO type to encode the luma block of the first block of video data, wherein the one or more processors are further configured to:
  encode a chroma block corresponding to the luma block using the selected SAO type without performing a coding pass to test any of the plurality of SAO types for the chroma block.

15. The device of claim 9, wherein to encode the second block using the selected SAO type and the offset values determined for the first block, the one or more processors are configured to generate a merge flag.

16. The device of claim 9, wherein to terminate the SAO information derivation process, the one or more processors are configured to terminate the SAO information derivation process prior to checking SAO information other than the selected SAO type and the offset values determined for the first block.

17. The device of claim 9, wherein the device comprises a wireless communication device, further comprising a transmitter configured to transmit encoded video data.

18. The device of claim 17, wherein the wireless communication device comprises a telephone handset and wherein the transmitter is configured to modulate, according to a wireless communication standard, a signal comprising the encoded video data.

* * * * *